Figure 1:
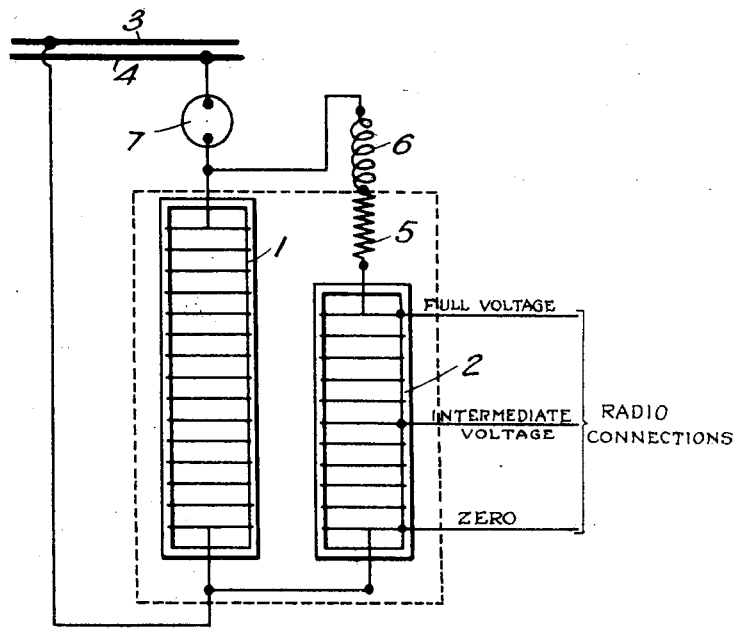

Dec. 8, 1931.　　　J. G. JACKSON　　　1,835,161
CURRENT RECTIFYING MEANS

Filed Oct. 8, 1925

Inventor
John G. Jackson
by
Johnston&ugh&Co.
Attys

Patented Dec. 8, 1931

1,835,161

UNITED STATES PATENT OFFICE

JOHN GRANT JACKSON, OF CHATHAM, ONTARIO, CANADA

CURRENT RECTIFYING MEANS

Application filed October 8, 1925. Serial No. 61,341.

My invention relates to improvements in devices for the conversion of pulsating electric currents into non-pulsating currents suitable as a source of power supply for radiotelephonic circuits, and the object of the invention is to devise an apparatus which shall be so effective as to be capable of removing fluctuations from the rectified current supply derived from a single unit rectifier adapted to pass only successive half waves of the same polarity from an alternating current source.

For this purpose I employ a device which I shall hereinafter designate as a galvanic reactor and which consists of a number of conductors, either metallic or non-metallic, connected together in series relation by means of suitable electrolytic conductors such that upon the passage of an electric current through the several conductors of the galvanic reactor a reactive electromotive force will be generated at the surfaces of contact between the electrolytic and solid conductors due to the formation of galvanically active films at such contact surfaces, either by polarization or by electrochemical change in the conducting bodies at the contact surfaces, or from both of these causes.

I preferably construct the galvanic reactors which I employ by assembling a series of sheets or plates of the solid conductors which it is desired to employ with intermediate spaces arranged to contain a suitable electrolyte which may be a twenty per cent solution of potash or caustic soda. The electrodes may be of iron, nickel, tin or carbon. The mechanical arrangement of the reactors can, however, by varied if desired. I find that when a galvanic reactor as described is acted upon by an impressed alternating electric current, a transient reactive electromotive force, leading in phase with respect to the impressed current wave, is generated within the reactor, the effect being similar in that respect to that of a condenser. When the impressed current wave is pulsating and unidirectional, the reactor functions in a manner similar to that described for alternating currents, except that a residual charge continues for an appreciable period after the termination of the impressed current wave from which it is derived.

I find, however, that the counter-electromotive force of a reactor of this type begins to be reduced in magnitude from a characteristic maximum immediately upon the cessation of the impressed current wave.

In order to produce a non-fluctuating electromotive force from a variable source, I employ a galvanic reactor in two parts, one part being a primary section arranged to derive its charging current directly from the variable source, which may be a single element rectifier adapted to pass half waves of alternating current, and the other portion being a secondary reactor section of less characteristic counter-electromotive force than that of the primary reactor section, the difference in maximum counter-electromotive force of the primary and secondary reactor sections being preferably equal to or greater than the amount by which the reactive electromotive force of the primary reactor section falls off between impulses of the charging current impressed thereon.

The secondary reactor section I connect in shunt relation across the terminals of the primary section preferably with one or more elements possessing suitable resistance which combined with the internal resistance of the secondary reactor section shall exceed the resistance of the primary reactor section included between the common terminals of the reactor sections and inductive reactance interposed in series with the secondary reactor section for the purpose of limiting current flow thereto and for the further purpose of retarding the flow of alternating or pulsating current waves therethrough.

The advantage attained by the arrangement of primary and secondary galvanic reactor sections described, is that the secondary reactor may be continuously subjected to the action of an impressed exciting or charging current derived alternatively from the source of pulsating current and between such impulses from the residual charge of the primary reactor section. While it is true that the secondary reactor section will thus be subjected to a variable impressed electromotive force, this will not appreciably affect the counter-electromotive force of the secondary reactor section as it will be maintained at its maximum characteristic value by the minimum impressed current flow and excess impressed potentials will be effectively short circuited through the reactor without appreciable resultant voltage rise therein.

It should be noted that the difference in counter-electromotive force of primary and secondary reactor sections may be attained either through the employment of a less number of film forming elements in the secondary than in the primary reactor section, or by employing in the secondary film forming elements of less characteristic electromotive force than that of elements employed in the primary reactor section.

In carrying out my invention I preferably employ primary and secondary sections of a galvanic reactor connected up in the manner illustrated in the accompanying drawings in which:—

Fig. 1 is a diagrammatic view of the primary and secondary reactor sections connected to a current rectifier which is in turn connected to an alternating current source.

Figure 2:
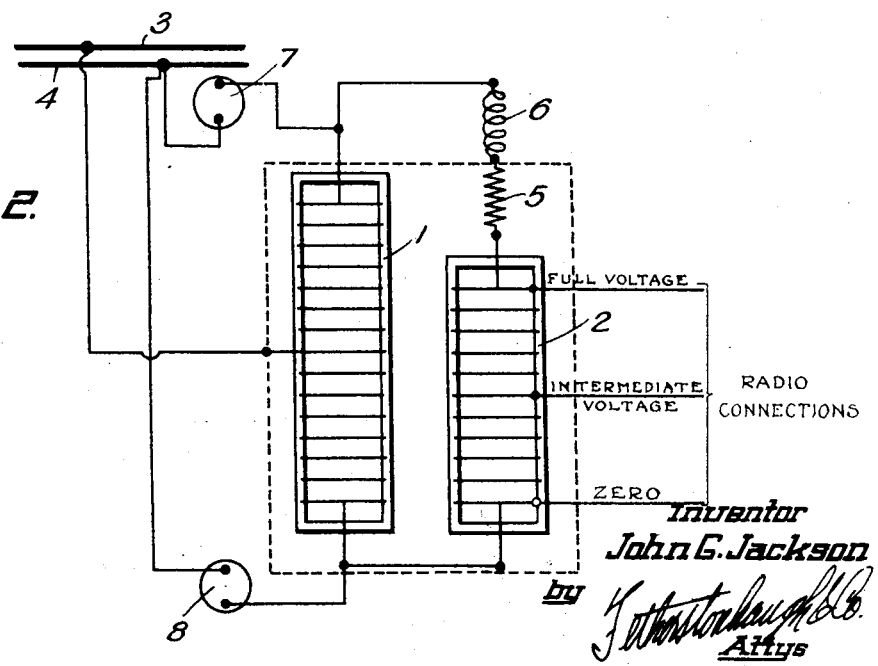

Fig. 2 is a diagrammatic view of a modified form of connecting the primary and second reactor sections so that the primary reactor section shall be divided into two preferably equal parts and current supplied thereto by means of two current rectifiers connected in reverse relation to the opposite ends of such primary reactor section. Both of the rectifiers derive their current from the same terminal of the alternating current source, the other side of the alternating current source being connected to the middle point of the primary reactor section so that the primary reactor section is energized by alternative half waves of rectified current of opposite polarity conducted through the half portions thereof of corresponding polarity.

The secondary reactor section when connected as illustrated in Figure 2 receives the combined effect of the half waves impressed upon the two parts of the primary reactor section.

Like characters of reference indicate corresponding parts in the different views.

1 is the primary reactor section and 2 is the secondary reactor section. 3 and 4 are the respective sides of the alternating current bus bar. 5 is a resistance and 6 is an inductive reactance. 7 is a current rectifier. Referring to Figure 1, it will be seen that the primary and secondary reactor sections are so connected as to form parallel paths for the electric current and within the path of the secondary reactor section the resistance and inductive reactance is introduced in series relation.

In the modified form illustrated in Figure 2 a second current rectifier 8 is employed connected in a reverse manner from that of the rectifier 7 and is connected to the opposite end of the primary reactor section 1, both rectifiers 7 and 8 deriving their current supply from a common side of the bus bar, the other side of the bus bar being connected substantially at the middle point of the primary reactor section 1.

In connecting my device whether of the form illustrated in Fig. 1 or Fig. 2, I connect the power supply circuit terminals to the plates of the secondary reactor section 2 as indicated in the drawings.

What I claim as my invention is:

1. A device for rectifying pulsating currents consisting of a primary electrolytic reactor consisting of two groups of parts, the parts of each group being in series with each other and each group being in series with the other group, a secondary electrolytic reactor coupled in parallel circuit connection with the primary reactor, a source of pulsating current, said source including circuit terminals, a rectifier in circuit with one of said terminals and in circuit with one of the groups of the primary reactor, the other group of said primary reactor being in circuit with the same terminal, a second rectifier coupled in circuit with said other group but in reversed relation to the first rectifier, circuit connections between the primary reactor and the secondary reactor including current retarding means in said connections with one group of said primary reactor and said first-named rectifier, circuit connections between the secondary reactor and the other group of said primary reactor and said second-named rectifier, circuit connections between the primary reactor and the other bus bar, and output leads connected with end plate parts of the secondary reactor.

2. A device for rectifying pulsating currents consisting of a primary electrolytic reactor consisting of two groups of parts, the parts of each group being in series with each other and each group being in series with the other group, a secondary electrolytic reactor coupled in parallel circuit connection with the primary reactor, a source of pulsating current, said source including circuit terminals, a rectifier in circuit with one of said terminals and in circuit with one of the groups of the primary reactor, the other group of said primary reactor being in circuit with the same terminal, a second rectifier coupled in circuit with said other group but in reversed relation to the first rectifier, circuit connections between the primary reactor and the secondary reactor including current retarding means in said connections with one group of said primary reactor and said first-named rectifier, circuit connections between the secondary reactor and the other group of said primary reactor and said second-named rectifier, circuit connections between the primary reactor and the other terminal, and output leads connected with end plate parts of the secondary reactor and with an intermediate plate part.

JOHN GRANT JACKSON.

CERTIFICATE OF CORRECTION.

Patent No. 1,835,161.  Granted December 8, 1931, to

JOHN GRANT JACKSON.

It is hereby certified that error appears in the printed specification of the above numbered patent requiring correction as follows: Page 2, lines 114 and 115, claim 1, for the words "bus bar" read terminal; and that the said Letters Patent should be read with this correction therein that the same may conform to the record of the case in the Patent Office.

Signed and sealed this 1st day of March, A. D. 1932.

(Seal)

M. J. Moore,
Acting Commissioner of Patents.